(12) United States Patent
Sethi et al.

(10) Patent No.: US 12,333,176 B2
(45) Date of Patent: Jun. 17, 2025

(54) SYSTEMS AND METHODS FOR SUPPORTING ALWAYS-ON APPLICATIONS FEATURING ARTIFICIAL INTELLIGENCE MODELS BY POPULATING PARALLEL DATA DOMAINS

(71) Applicant: Capital One Services, LLC, McLean, VA (US)

(72) Inventors: Trijeet Sethi, McLean, VA (US); Muralikumar Venkatasubramaniam, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 45 days.

(21) Appl. No.: 18/352,720

(22) Filed: Jul. 14, 2023

(65) Prior Publication Data
US 2025/0021257 A1 Jan. 16, 2025

(51) Int. Cl.
*G06F 3/06* (2006.01)
(52) U.S. Cl.
CPC ............ *G06F 3/065* (2013.01); *G06F 3/0626* (2013.01); *G06F 3/067* (2013.01)

(58) Field of Classification Search
CPC .......... G06F 3/065; G06F 3/0626; G06F 3/067
See application file for complete search history.

(56) References Cited

U.S. PATENT DOCUMENTS

| | | | |
|---|---|---|---|
| 11,977,816 B1* | 5/2024 | Sepasi Ahoei | ........ G06F 40/134 |
| 2020/0261803 A1* | 8/2020 | Anderson | ............... A63F 13/24 |
| 2022/0301542 A1* | 9/2022 | Sung | ........................ G10L 25/78 |
| 2023/0206898 A1* | 6/2023 | Stanton | ................. G10L 13/027 |
| | | | 704/260 |

* cited by examiner

*Primary Examiner* — Nanci N Wong
(74) *Attorney, Agent, or Firm* — Foley & Lardner LLP

(57) ABSTRACT

Systems and methods for a novel architecture to support always-on applications and/or models suffering drift in their results. The system may comprise one or more servers that are configured to track the historical behavior of incoming request data for a model and/or redirect the request as needed using parallel data domains. The one or more servers may maintain and update a catalog of potential data domains that partitions the historically received data. One partition may comprise data output from a current model. Another partition may comprise detected outliers in the data. In the case of drift, outliers, and/or anomalies in the incoming data, the system may return an error signal that causes data to be duplicated into a new data domain.

20 Claims, 4 Drawing Sheets

SYSTEMS AND METHODS FOR SUPPORTING ALWAYS-ON APPLICATIONS FEATURING ARTIFICIAL INTELLIGENCE MODELS BY POPULATING PARALLEL DATA DOMAINS

BACKGROUND

Always-on applications, which are designed to be continuously available and responsive, can face several technical issues. For example, always-on applications must handle varying levels of user demand efficiently. As the user base grows or traffic spikes occur, the application needs to scale seamlessly to accommodate the increased load. Moreover, maintaining high availability is crucial for always-on applications. Any single point of failure, such as a server or network component, can lead to service disruptions.

The issues with always-on applications are further exacerbated in instances using artificial intelligence, including, but not limited to, machine learning, deep learning, etc. (referred to collectively herein as artificial intelligence models, machine learning models, or simply models). Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations. However, despite these benefits and despite the wide-ranging number of potential applications, practical implementations of artificial intelligence have been hindered by several technical problems. First, artificial intelligence may rely on large amounts of high-quality data. The process for obtaining this data and ensuring that it is high quality can be complex and time-consuming. Additionally, data that is obtained may need to be categorized and labeled accurately, which can be difficult, time-consuming, and a manual task. Second, results based on artificial intelligence can be difficult to review as the process by which the results are made may be unknown or obscured. This obscurity can create hurdles for identifying errors in the results as well as for improving the models providing the results.

Accordingly, if errors are detected in the results of a model, the act of accounting for errors in a model creates a substantial technical burden as retaining the model may once again require obtaining large amounts of data, categorizing and/or labeling the data, and testing the retrained model for accuracy. Due to the retraining, the model, or an application that is dependent on the model, may face significant downtime. Thus, the use of artificial intelligence based-solutions in always-on applications is limited.

SUMMARY

In view of the aforementioned technical problems, systems and methods are described herein for novel uses and/or improvements to artificial intelligence applications. As one example, systems and methods are described herein for a novel architecture to support always-on applications and/or models suffering drift in their results.

More specifically, the system may comprise one or more servers that are configured to track the historical behavior of incoming request data for a model and/or redirect the request as needed using parallel data domains. For example, to address the technical issues cited above, the one or more servers may serve a dual purpose of acting as a reverse proxy and executing an analytical framework that can identify concept and/or data drift in incoming data requests. The one or more servers may maintain and update a catalog of potential data domains that partitions the historically received data. One partition may comprise data output from a current model. Another partition may comprise detected outliers in the data. In the case of drift, outliers, and/or anomalies in the incoming data, the system may return an error signal that causes data to be duplicated into a new data domain. By using the parallel partitioning, the system may detect outliers while continuing to serve an always-on application. Furthermore, by duplicating data, as opposed to directing data to one domain or the other, the system prevents data loss (e.g., 5% in conventional systems).

Not only does the use of parallel data domains allow for the continued service to the always-on application, but the parallel data domain also allows for operations to be executed on the data domain comprising the detected outliers. As such, the system may use the data domain comprising the detected outliers to determine when new models should be deployed. For example, the system is equipped with a parameter that thresholds a minimum size of the new data domain (e.g., comprising the detected outliers). Once this threshold is crossed, the system may automatically redeploy a refit model (e.g., trained on the detected outliers) by repointing incoming data requests that fall into the data domain of the currently employed model to the new refit model. By doing so, the system allows for a real-time rebalancing of model performance through the construction of domain-specific sub-models in the event of concept and/or data drift without affecting service to applications being served by currently deployed models.

In some aspects, systems and methods for supporting always-on applications featuring artificial intelligence models by populating parallel data domains are described. For example, the system may receive a first data output from a first model. The system may determine, based on statistical analysis, whether the first data output corresponds to a first data domain or a second data domain. The system may, in response to determining that the first data output corresponds to the first data domain, generate a second data output by duplicating the first data output and adding the second data output to the first data domain. The system may determine, based on adding the second data output, a first size of the first data domain. The system may compare the first size to a first threshold size to determine whether the first size corresponds to the first threshold size. The system may, in response to determining that the first size corresponds to the first threshold size, determine to deploy a second model.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
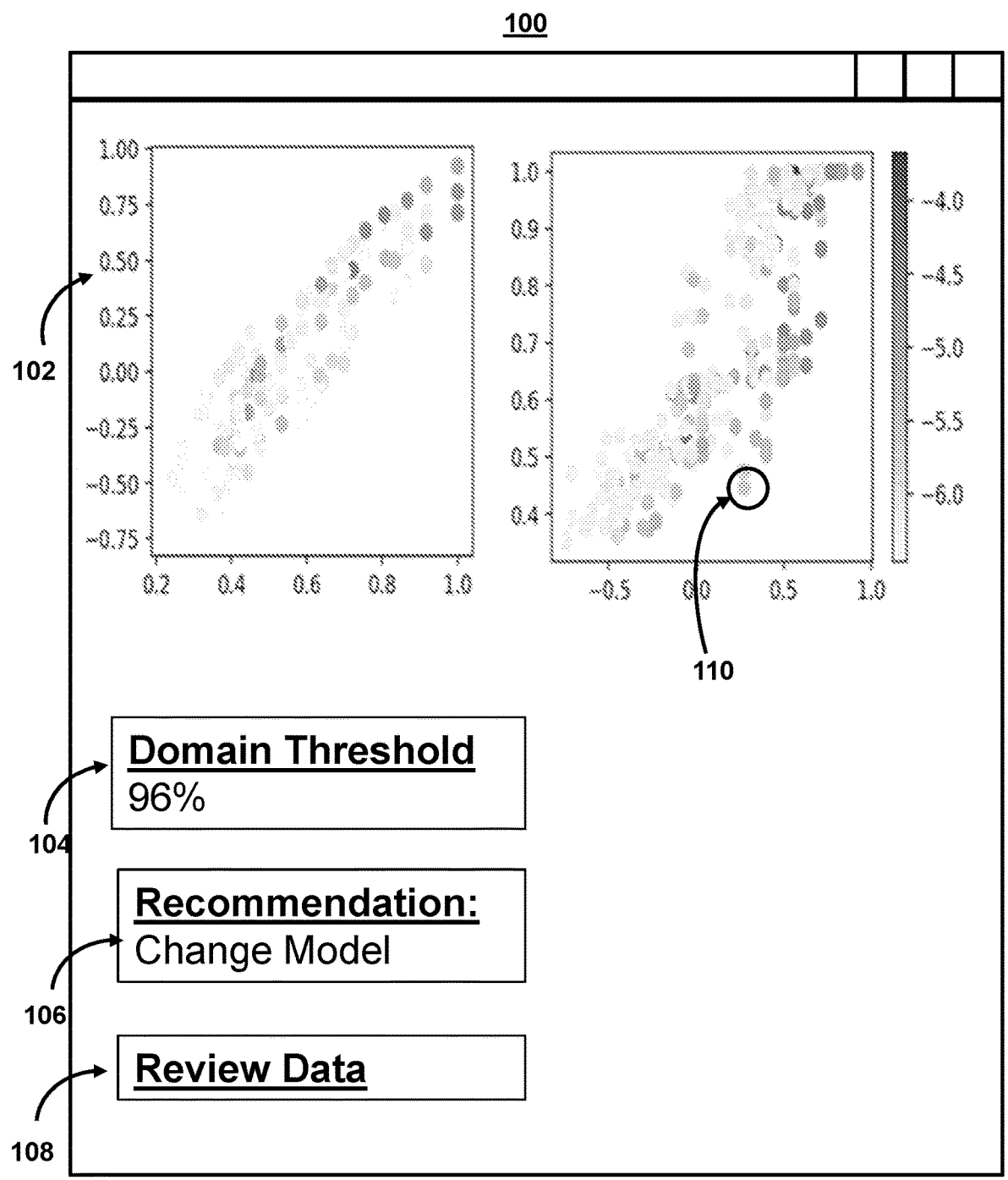
FIG. 1 shows an illustrative system user interface for determining whether to institute a model refit, in accordance with one or more embodiments.

FIG. 1 shows an illustrative system user interface for determining whether to institute a model refit, in accordance with one or more embodiments. For example, user interface 100 may support always-on applications featuring artificial intelligence models by populating parallel data domains. For example, the system and methods described herein may generate for display, on a local display device (e.g., user terminal 324 (FIG. 3) described below), a user interface for triggering a model refit. As described herein, model refitting refers to the process of updating or adjusting a model after it has been trained on an initial dataset. For example, when new data becomes available, or when the model's performance needs improvement, refitting can be performed to incorporate the new information and enhance the model's predictive capabilities.

An always-on application may be a type of software or service that is designed and engineered to be continuously available and accessible to users without interruption. It refers to applications that strive for high uptime and responsiveness, aiming to minimize or eliminate any downtime or service disruptions. Always-on applications may be built to provide uninterrupted service to users, ensuring that the application is accessible and operational around the clock. High availability is achieved through redundancy, fault tolerance, and robust infrastructure design. Additionally or alternatively, these applications may be designed to respond quickly to user requests or events. They aim to minimize latency and provide immediate feedback or results to maintain a seamless user experience. Additionally or alternatively, these applications may be engineered to handle varying levels of user demand and traffic. They are designed to scale horizontally by adding more resources (servers, instances) or employing load-balancing techniques to distribute the workload efficiently. Additionally or alternatively, these applications may be resilient and can withstand failures or disruptions. They employ fault-tolerant mechanisms such as redundancy, failover, and disaster recovery strategies to ensure that the application continues to function even in the event of failures. Additionally or alternatively, these applications may be equipped with monitoring systems that continuously track the application's performance, availability, and health. Automated self-healing mechanisms can detect issues, initiate recovery processes, and take corrective actions to mitigate potential problems.

As described herein, a data domain may refer to the set of possible values that a variable or attribute can take within a dataset. It represents the range or scope of values that are valid and relevant for a particular attribute. The data domain defines the boundaries and characteristics of the data values, which can vary depending on the type of attribute. The data domain may be a numeric domain, categorical domain, ordinal domain, or temporal domain. For numeric variables, such as age or income, a data domain may comprise of a range of numerical values. For example, the age domain could be from 0 to 100, while the income domain could span from 0 to infinity. Categorical variables represent discrete, non-numeric values. The data domain of a categorical variable is defined by the set of distinct categories or levels it can have. For instance, a categorical variable for gender may have two levels: "male" and "female." Ordinal variables have values with an inherent order or ranking. The data domain of an ordinal variable reflects this ordering. For example, an ordinal variable representing educational attainment may have levels like "high school," "bachelor's degree," and "master's degree," with a clear hierarchy. For variables representing dates or timestamps, the data domain encompasses a range of valid dates or points in time. The domain may specify a starting and ending date, the time granularity (e.g., year, month, day, hour), and any specific constraints or formats.

In some embodiments, the system may refit a model by gathering new data. For example, the system may collect additional data that was not included in the original training set. This new data may be representative of the problem domain and include relevant features. Additionally or alternatively, the system may apply one or more preprocessing steps to refit a model. For example, the system may apply necessary preprocessing steps to the new data, such as cleaning, normalization, feature engineering, or handling missing values. In some embodiments, the system may preprocess the new data consistently with the original training data to maintain compatibility. Additionally or alternatively, the system may retrain a model when refitting the model. For example, the system may use an updated dataset (e.g., the original training data plus new data) to retrain the model. This process may involve adjusting the model's internal parameters based on the updated information to improve its performance. Additionally or alternatively, the system may perform an evaluation on a model prior to, or after, the refit. For example, the system may assess a refitted model's performance using appropriate evaluation metrics, such as accuracy, precision, recall, or mean squared error, depending on the problem type (classification, regression, etc.). If the refitted model does not meet the desired performance, the process can be repeated by further refining the data, refining the feature selection, or adjusting hyperparameters until satisfactory results are achieved.

User interface 100 may comprise an interface for a model performance and monitoring tool. Through user interface 100, the model performance and monitoring tool may monitor model performance quality, detect modeling errors, provide recommendation, and/or perform one or more operations for the model performance and monitoring tool. For example, user interface 100 may be used in the model refit stage in a model lifecycle. User interface 100 may be used to enable an automated procedure to detect when data has drifted (e.g., signal for a model refit/analysis by the model owner) without having to disturb a serving model. The tool may use a server situated in front of the model and may train a new/specialized model on data that does not fit the original intended domain after it has seen a sufficient sample.

As referred to herein, a "user interface" may comprise a human-computer interaction and communication in a device and may include display screens, keyboards, a mouse, and the appearance of a desktop. For example, a user interface may comprise a way a user interacts with an application or a website. As referred to herein, "content" should be understood to mean an electronically consumable user asset, such as Internet content (e.g., streaming content, downloadable content, webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but can also be part of a live performance. Furthermore, user-generated content may include content created and/or consumed by a user. For example, user-generated content may include content created by another but consumed and/or published by the user.

User interface 100 may comprise a plurality of icons, recommendations, and/or other data. For example, user interface 100 may comprise data 102, which may comprise results from one or more models. In some embodiments, data 102 may include a plurality of data entries, wherein the data comprises a table that comprises a first plurality of rows, and wherein each row of the first plurality of rows corresponds to a respective feature importance model in the first subset. In some embodiments, data 102 may comprise a plurality of model outputs. The model outputs may include output 110, which may be detected as an outlier based on one or more statistical metrics.

User interface 100 may also include recommendation 106. For example, selection of recommendation 106 may cause the model performance and monitoring tool to provide a recommendation and/or execute a recommendation (e.g., trigger a new model to be used). In some embodiments, the system may train a new model while using an existing model. For example, the system may retrain a model based on detected outliers. Models can be retrained on feedback data to improve their performance and adapt to new information. Feedback data may comprise data from one or more domains (e.g., domains comprising outlier data) of additional labeled examples or user feedback that provides new information or corrections related to the model's predictions or outputs. This feedback data can be collected through various means, such as user interactions, user ratings, explicit annotations, or manual reviews. The collected feedback data may be combined with the existing training data. This expanded dataset will be used to retrain the model. The feedback data can be mixed with the original training data or added as a separate dataset, depending on the specific retraining approach. The model may then be retrained using the updated training data. The retraining process typically involves iterative steps of feeding the training data through the model, adjusting the model's parameters through techniques like gradient descent, and optimizing the model's performance. The specifics of the retraining process depend on the model type and the algorithms used. For example, the system may retrieve a dataset from the first data domain. The system may retrain the first model using the data.

User interface 100 may also display data 104, which may indicate information about a model and/or data produced by the model. For example, data 104 may display additional data, which may be accessed via a selection of icon 108. For example, user interface 100 may comprise a status page that includes summary information about the model performance and monitoring tool, requesting applications, feature importance metrics, and/or accuracy metrics. For example, the system may receive a threshold size for a domain. The system may select the threshold size based on one or more criteria. For example, the system may set a threshold size based on how many outliers a given model, application, and/or time period may have.

In some embodiments, user interface 100 may be linked to memory that stores a plurality of models and/or a plurality of accuracy metrics for each model of the plurality of feature importance models, wherein each of the plurality of accuracy metrics corresponds to a respective accuracy metric for each of a plurality of applications and/or an output of a model. Using user interface 100, a user may access and/or interact with this data. For example, the model performance and monitoring tool may receive a user request for use, by a requesting application, of one of a plurality of feature importance models. In response, the system may determine, for a first model of the plurality of feature importance models, the respective accuracy metric for the requesting application. The system may then select the first model from the plurality of models based on the respective accuracy metric.

As referred to herein, an accuracy metric may comprise any quantitative or qualitative assessment of the accuracy of a model and/or output thereof. The accuracy metric may be specific to a given application or may relate to all applications and/or datasets. In some embodiments, the accuracy metric may be based on an amount of modeling error attributed to a feature importance metric.

As referred to herein, a "modeling error" or simply an "error" may correspond to an error in the performance of a model. For example, an error in a model may comprise an inaccurate or imprecise output or prediction for the model. This inaccuracy or imprecision may manifest as a false positive or a lack of detection of a certain event. These errors may occur in models corresponding to a particular sub-segment that results in inaccuracies for predictions and/or outputs based on the sub-segment, and/or the errors may occur in models corresponding to an aggregation of multiple sub-segments that result in inaccuracies for predictions and/or outputs based on errors received in one or more of predictions of the plurality of sub-segments and/or an interpretation of the predictions of the plurality of sub-segments.

As shown in FIG. 1, at data 104, the system may score the individual data and generate model-scored data. For example, the score may refer to a metric for all outputs a given model or a specific output. A higher metric means that the specific output may constitute a larger outlier (or a model is less accurate). In some embodiments, metrics may be used when training a model. The system may use metrics calculated from outputs to reduce the dimensionality of the model. The higher metrics (or outputs with higher metrics) are kept while lower metrics are filtered out. This not only makes the model simpler but also increases the speed of the model, ultimately improving the performance of the model.

In some embodiments, a feature importance metric (e.g., in a decision tree) may be determined by the equation below, which gives the importance of a node j, which is used to calculate the feature importance.

$$fi_i = \frac{\sum_{j: \text{node } j \text{ splits in feature } i} ni_j}{\sum_{j \in \text{all nodes}} ni_j}$$

Figure 2:
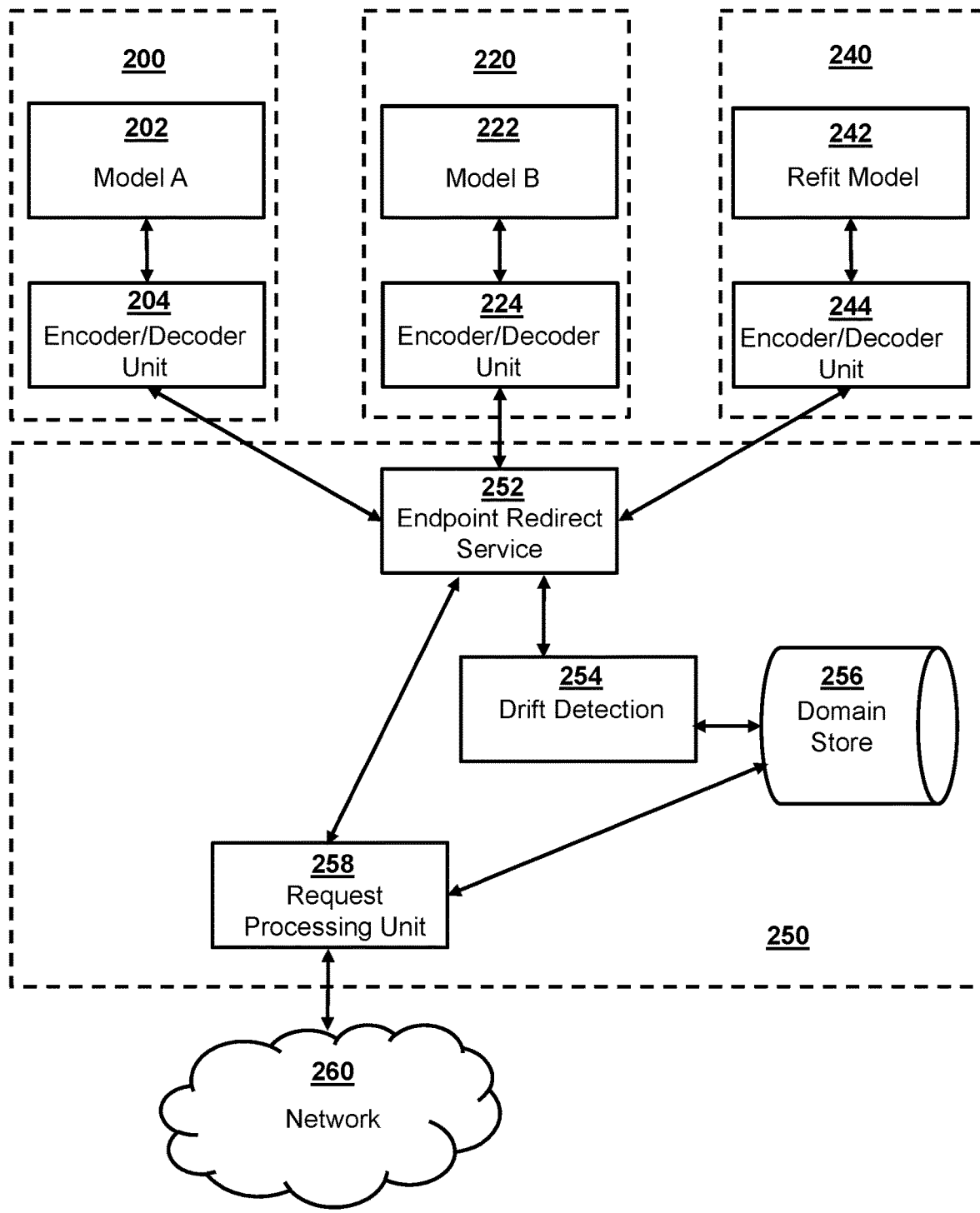
FIG. 2 shows an illustrative diagram of a system populating parallel data domains, in accordance with one or more embodiments.

In such cases:
$ni_j$=node j importance
wj=weighted number of samples reaching node j Cj=the impurity value of node j left(j)=child node on left of node j right(j)=child node on right of node j For example, a score may indicate a degree of error (or accuracy and/or precision) for an output or prediction for the model. The model may correspond to a particular sub-segment and/or an aggregation of multiple sub-segments. The system may then, via icon 108, generate summarized data by key input variables (e.g., which may be presented in a tabular format (e.g., as shown in FIG. 2)). For example, the input variables may correspond to a given feature. For example, the system may generate a respective status summary. The respective status summary may include any qualitative or quantitative description of data (e.g., error patterns, predictions, assessments) of one or more models and/or applications.

FIG. 2 shows an illustrative diagram of a system populating parallel data domains, in accordance with one or more embodiments. For example, FIG. 2 includes model executor 200, model executor 220, and refit model 240. Each of model executor 200, model executor 220, and refit model 240 may comprise a respective model and encoder/decoder unit (e.g., model executor 200 includes model 202 and unit 204, model executor 220 includes model 222 and unit 224, and refit model 240 includes model 242 and unit 244).

FIG. 2 also shows server 250. For example, the system may comprise one or more servers that are configured to track the historical behavior of incoming request data for a model (e.g., model 202, model 222, etc.) and/or redirect the request as needed using parallel data domains. For example, to address the technical issues cited above, the one or more servers may serve a dual purpose of acting as a reverse proxy and executing an analytical framework that can identify concept and/or data drift in incoming data requests.

Server 250 comprises redirection service 252. For example, the one or more servers may maintain and update a catalog of potential data domains that partitions the historically received data. Redirection service 252 may direct model outputs to one domain (e.g., request processing unit 258) or another domain (e.g., drift detection 254). One partition may comprise data output from a current model for use in serving, via network 260, one or more applications (e.g., request processing unit 258). Another partition may comprise detected outliers in the data. In the case of drift, outliers, and/or anomalies in the incoming data, the system may return an error signal that causes data to be duplicated into a new data domain (e.g., drift detection 254). By using the parallel partitioning, the system may detect outliers while continuing to serve an always-on application. Furthermore, by duplicating data, as opposed to directing data to one domain or the other, the system prevents data loss (e.g., 5% in conventional systems).

Not only does the use of the parallel data domain allow for the continued service to the always-on application but also the parallel data domain allows for operations to be executed on the data domain comprising the detected outliers. For example, outlier data may be stored in domain store 256. As such, the system may use the data domain comprising the detected outliers (e.g., domain store 256) to determine when new models should be deployed. For example, the system is equipped with a parameter that thresholds a minimum size of the new data domain (e.g., comprising the detected outliers). Once this threshold is crossed, the system may automatically redeploy refit model 242 (e.g., trained on the detected outliers) by repointing incoming data requests that fall into the data domain of the currently employed model to the new refit model. By doing so, the system allows for a real-time rebalancing of model performance through the construction of domain-specific sub-models in the event of concept and/or data drift without affecting service to applications being served by currently deployed models.

Figure 3:
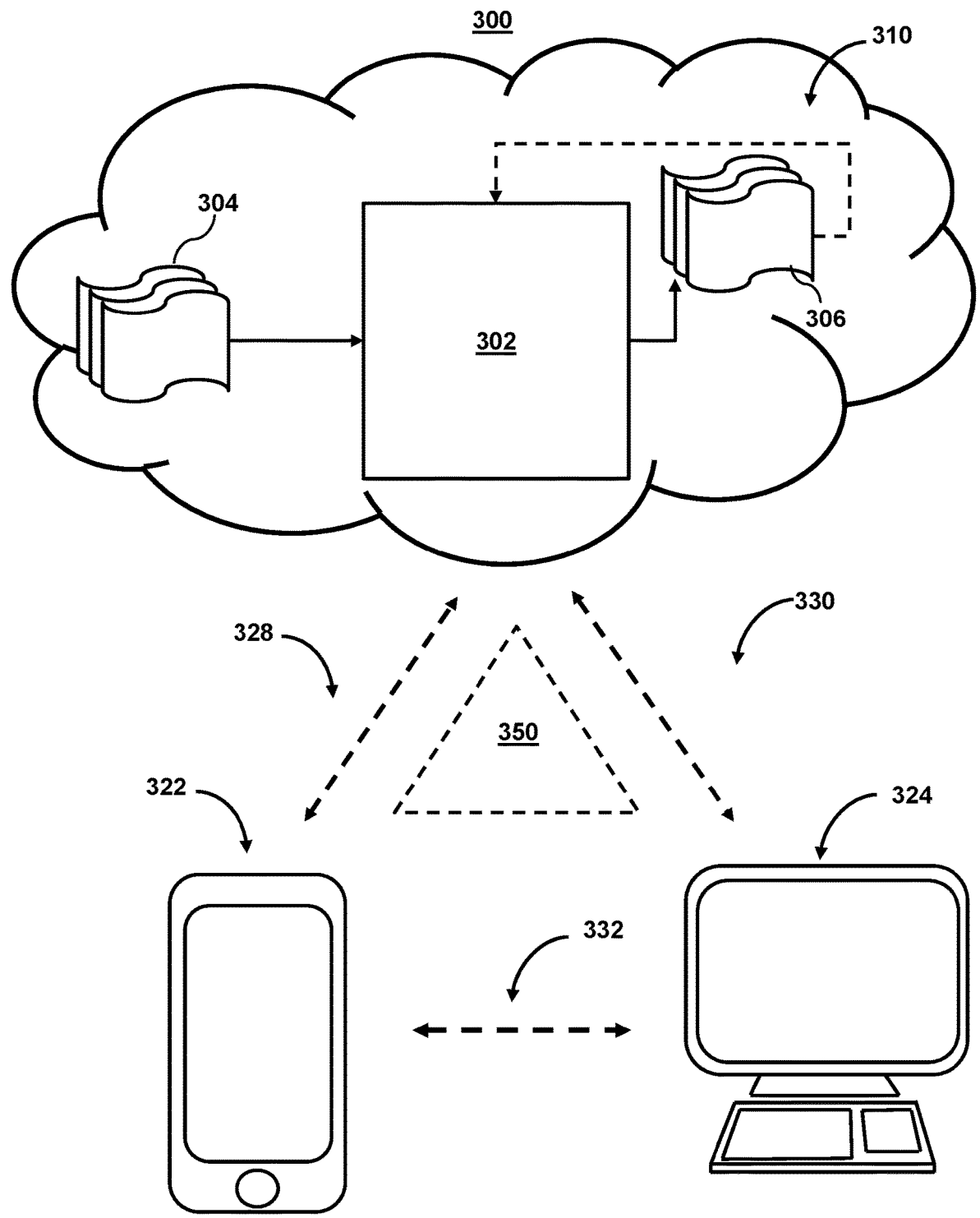
FIG. 3 shows illustrative components for a system using artificial intelligence models, in accordance with one or more embodiments.

FIG. 3 shows illustrative components for a system using artificial intelligence models, in accordance with one or more embodiments. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above and may include any type of mobile terminal, fixed terminal, or other device. For example, cloud components 310 may be implemented as a cloud computing system and may feature one or more component devices. It should also be noted that system 300 is not limited to three devices. Users may, for instance, utilize one or more devices to interact with one another, one or more servers, or other components of system 300. It should be noted that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that, in some embodiments, the devices may have neither user input interfaces nor displays and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, virtual private networks, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include model 302, which may be a machine learning model, artificial intelligence model, etc. (which may be referred to collectively as "models" herein). Cloud components 310 may also include components described in FIG. 2. Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., outlier status and/or information used to determine outlier status, outlier data used to train a refit model, parameters for a refit model, etc.).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving as compared to traditional computer programs. During training, an output layer of model 302 may correspond to a classification of model 302, and an input known to correspond to that classification may be input into an input layer of model 302 during training. During testing, an input without a known classification may be input into the input layer and a determined classification may be output.

In some embodiments, model 302 may include multiple layers (e.g., where a signal path traverses from front layers to back layers). In some embodiments, backpropagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., outlier status and/or information used to determine outlier status, outlier data used to train a refit model, parameters for a refit model, etc.).

In some embodiments, the model (e.g., model 302) may automatically perform actions based on outputs 306. In some embodiments, the model (e.g., model 302) may not perform any actions. The output of the model (e.g., model 302) may be used to refit a model and/or detect outliers.

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be a REST or web services API layer) may provide a decoupled interface to data and/or functionality of one or more applications. API layer 350 may provide a common, language-agnostic way of interacting with an application. Web services APIs offer a well-defined contract, called WSDL, that describes the services in terms of the API's operations and the data types used to exchange information. REST APIs do not typically have this contract; instead, they are documented with client libraries for most common languages, including Ruby, Java, PHP, and JavaScript.

SOAP web services have traditionally been adopted in the enterprise for publishing internal services as well as for exchanging information with partners in B2B transactions.

API layer 350 may use various architectural arrangements. For example, system 300 may be partially based on API layer 350, such that there is strong adoption of SOAP and RESTful web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: front-end layer and back-end layer where microservices reside. In this kind of architecture, the role of API layer 350 may provide integration between front-end and back-end layers. In such cases, API layer 350 may use RESTful APIs (exposition to front-end layer or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API platforms and their modules. API layer 350 may use a developer portal. API layer 350 may use strong security constraints applying WAF and DDOS protection, and API layer 350 may use RESTful APIs as standard for external integration.

Figure 4:
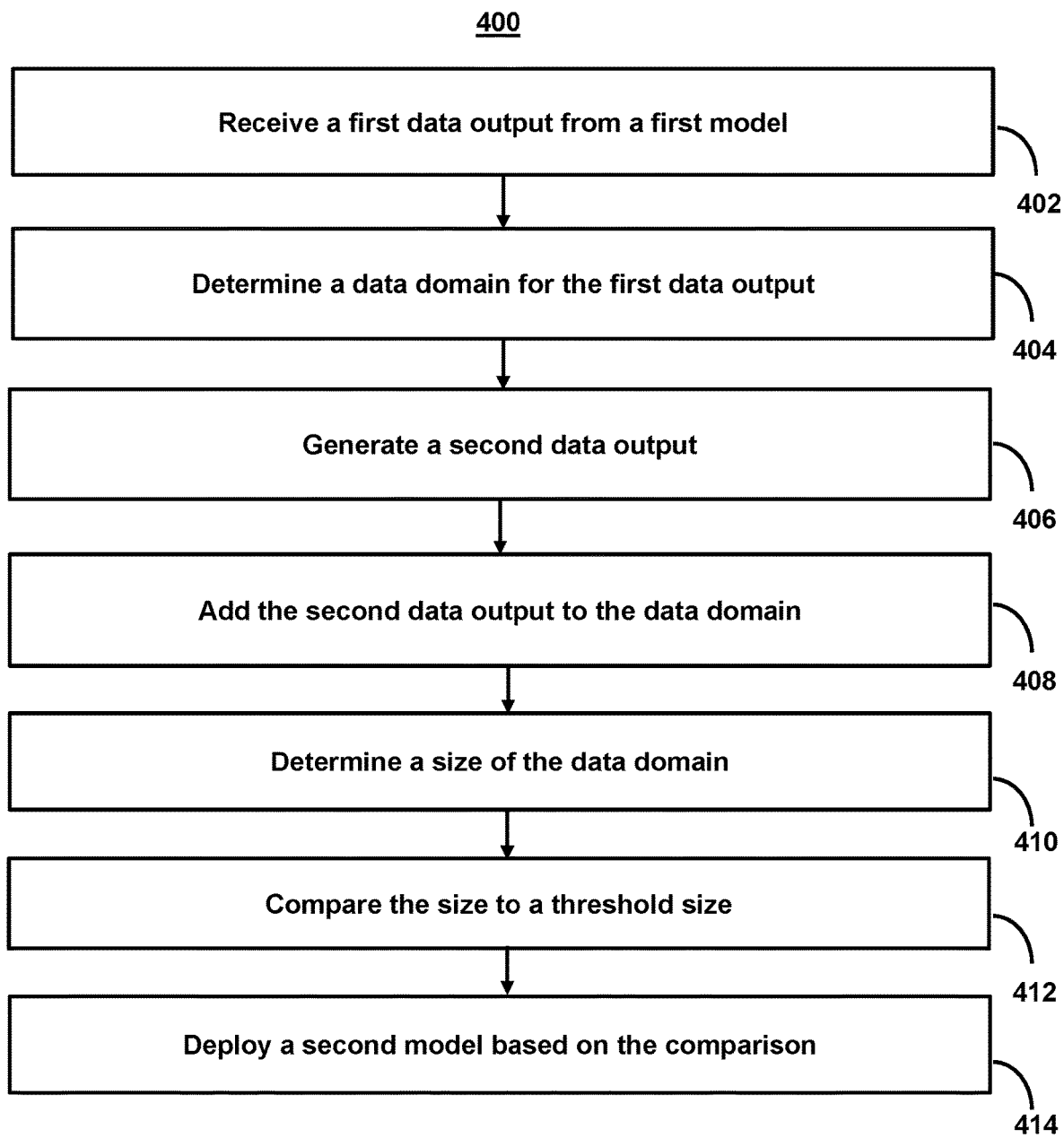
FIG. 4 shows a flowchart of the steps involved in the method for supporting always-on applications, in accordance with one or more embodiments.

FIG. 4 shows a flowchart of the steps involved in the method for supporting always-on applications, in accordance with one or more embodiments. For example, the system may use process 400 (e.g., as implemented on one or more system components described above) in order to support always-on applications featuring artificial intelligence models by populating parallel data domains.

At step 402, process 400 (e.g., using one or more components described above) receives a first data output from a first model. For example, the system may receive a first data output from a first model. In some embodiments, the system may use a plurality of models that generate one or more outputs. The output from a model may depend on the specific task and the type of model being used. In classification tasks, the model assigns input data to predefined categories or classes. The output can be a single class label indicating the predicted category. For instance, in an image classification model, the output could be a label indicating the recognized object in the image, such as "cat" or "dog." In regression tasks, the model may predict a numerical value or a continuous output based on the input data. For example, in a housing price prediction model, the output could be a predicted price value in dollars. In sequence generation tasks, the model may generate a sequence of data based on the input. This can be useful for tasks like text generation, where the model can produce sentences, paragraphs, or even entire articles as the output. In object detection tasks, the model identifies and localizes objects within an image or a video. The output typically includes bounding boxes around the detected objects, along with labels indicating the class of each object present. In sentiment analysis tasks, the model determines the sentiment expressed in a given text, such as positive, negative, or neutral. The output can be a sentiment label or a numerical score representing the sentiment polarity. In recommendation systems, the model suggests items or content based on user preferences or historical data. The output can be a list of recommended items ranked by relevance or personalized scores. In decision-making tasks, the model provides recommendations or actions based on the input and learned patterns. For example, in autonomous driving systems, the output could be driving commands like acceleration, braking, or steering angles.

At step 404, process 400 (e.g., using one or more components described above) determines a data domain for the first data output. For example, the system may determine, based on statistical analysis, whether the first data output corresponds to a first data domain or a second data domain. In some embodiments, the system may determine a domain for a data output based on determining whether the data output is a statistical outlier. Statistical outliers are data points that significantly deviate from the expected or typical pattern of a dataset. The system may use one or more techniques to determine a statistical outlier such as Tukey's fences or boxplots. Tukey's fences define a range around the median of a dataset. Any data point falling below the lower fence or above the upper fence is considered an outlier. The fences are calculated based on the interquartile range (IQR), which is the range between the first quartile (25th percentile) and the third quartile (75th percentile). Boxplots provide a visual representation of the distribution of a dataset. Data points falling outside the whiskers (lines extending from the box) are often considered outliers. The whiskers can be defined using the 1.5*IQR rule or other methods.

In some embodiments, the system may determine the domain of an output based on a Z-score. The Z-score method measures how many standard deviations a data point is away from the mean of the dataset. Typically, data points with a Z-score greater than a certain threshold (e.g., 2 or 3) are considered outliers. For example, the system may determine a mean for a dataset output by the first model. The system may determine a number of standard deviations of the first data output from the mean. The system may compare the number of standard deviations to a threshold number of standard deviations to determine whether the first data output corresponds to the first data domain.

In some embodiments, the system may determine the domain of an output based on a modified Z-score. The modified Z-score is a robust method that is less sensitive to extreme values compared to the standard Z-score. It uses the median and median absolute deviation (MAD) to calculate the Z-score, making it suitable for datasets with outliers. For example, the system may determine a median for a dataset output by the first model. The system may determine a median absolute deviation of the first data output. The system may compare the median absolute deviation to a threshold median absolute deviation to determine whether the first data output corresponds to the first data domain.

In some embodiments, the system may determine the domain of an output based on a distance-based outlier detection method. Distance-based methods, like the k-nearest neighbors (k-NN) algorithm, identify outliers based on their distance to neighboring data points. Points that are significantly distant from their k-NN are flagged as outliers. For example, the system may determine a distance of the first data output from a nearest neighboring data in a dataset output by the first model. The system may compare the distance to a threshold distance to determine whether the first data output corresponds to the first data domain.

In some embodiments, the system may determine the domain of an output based on a density-based outlier detection method. Density-based algorithms, such as DBSCAN (Density-Based Spatial Clustering of Applications with Noise), identify outliers based on the density of data points. Points that lie in low-density regions or have very few neighboring points are considered outliers. For example, the system may determine a region for the first data output in a dataset output by the first model. The system may determine a data point density of the region. The system may compare the data point density to a threshold data point density to determine whether the first data output corresponds to the first data domain.

At step 406, process 400 (e.g., using one or more components described above) generates a second data output. For example, the system may generate a second data output by duplicating the first data output in response to determining that the first data output corresponds to the first data domain. For example, the system may select and copy the data output from its source (e.g., from a second data domain) and paste it into a new location or file (e.g., the first data domain). The system may create and maintain duplicate copies of data across multiple storage locations or systems. Data duplication or replication may be used for retraining a model, supporting distributed systems, performing data synchronization, and/or performing other purposes for ensuring high availability of the model. In some embodiments, the system may use master-slave or master-master replication. In master-slave, one database server (the master) is responsible for handling write operations, while multiple replica servers (slaves) copy the data from the master and handle read operations. The master server logs changes and replicates them to the replica servers, ensuring data consistency. In master-master, multiple database servers act as both masters and replicas. Each server can handle write and read operations, and changes made on one server are replicated to others bidirectionally. This allows for distributed data updates and load balancing. Additionally or alternatively, the system may use file-level replication. File-level replication involves duplicating files and directories from a source location to one or more destination locations. This can be done manually or through file synchronization tools that monitor changes and update the replicated copies accordingly.

In some embodiments, the system may use master-slave replication. For example, the system may use one database server (the master) that is responsible for handling write operations, while multiple replica servers (slaves) copy the data from the master and handle read operations. The master server logs changes and replicates them to the replica servers, ensuring data consistency. For example, the system may receive a write operation from a first server to generate the second data output. The system may log, by the first server, the write operation.

At step 408, process 400 (e.g., using one or more components described above) adds the second data output to the data domain. For example, the system may add the second data output to the first data domain. For example, adding data to a domain may refer to incorporating or inserting new data into an existing dataset or database. Before adding data to a domain, the system may ensure that the data is properly prepared and formatted. This may involve activities such as cleaning the data, validating its integrity, transforming it into a compatible format, or standardizing the data structure. Additionally or alternatively, the system may require appropriate access rights and permissions to the domain or the database in which the domain resides. This may require authentication and authorization to ensure that only authorized individuals or processes can modify the data.

In some embodiments, the system may determine where within a domain the new data should be added. To do so, the system may identify a specific table, collection, or schema where the data will reside. If using a file system, the system may determine the appropriate directory or folder for storing the data. For example, the system may determine a first table in the first data domain. The system may store the second data output in the first table.

In some embodiments, the system may use pointers to store data by assigning memory addresses to variables or data objects. A pointer is a variable that holds the memory address of another variable or data structure rather than the actual value itself. Pointers enable efficient memory management and allow computers to access and manipulate data indirectly. For example, when a variable is declared, the system reserves a block of memory to store its value. The size of this memory block depends on the data type of the variable. Each memory location in the system's memory has a unique address. When a variable is created, the system assigns a specific memory address to that variable. To create a pointer, a separate variable of a pointer type is declared. The pointer variable is typically defined to match the data type of the variable it will point to. For example, the system may determine a first pointer location for the first data domain. The system may store the second data output based on the first pointer location.

At step 410, process 400 (e.g., using one or more components described above) determines a size of the data domain. For example, the system may determine, based on adding the second data output, a first size of the first data domain. In some embodiments, the system may determine the size of a domain based on the specific data type and/or the memory representation used for storing that data type. The domain size may be the range or set of values that can be stored within a particular data type. The size is typically measured in terms of the number of bits or bytes required to represent the data.

In some embodiments, the system may use floating-point data types. Floating-point data types, like float or double, are used to represent real numbers. The size of these types also depends on the programming language and architecture. In most languages, a float typically uses 4 bytes (32 bits), while a double uses 8 bytes (64 bits). The domain of floating-point numbers is much larger but finite, with varying precision and range based on the specific type. Alternatively or additionally, the system may use an integer data type. Integer data types, such as int, short, or long, have predefined sizes based on the architecture and programming language. For example, in the C programming language, an int typically uses 4 bytes (32 bits) of memory, allowing it to represent a domain of values ranging from −2,147,483,648 to 2,147,483,647 (assuming a signed integer representation using two's complement). Alternatively or additionally, the system may use character data types. Character data types, such as char, represent individual characters or small-sized sized data. In many programming languages, a char occupies 1 byte (8 bits) of memory and can store a single character or a small integer value within a limited domain, typically ranging from −128 to 127 (for signed char) or 0 to 255 (for unsigned char). Additionally or alternatively, the system may determine a custom data structure for the first domain. For example, the size of a domain can depend on custom data structures or user-defined types. For example, if the system defines a struct in a programming language, the size of the structure will be determined by the combined sizes of its constituent elements. For example, the system may determine floating-point data corresponding to the second data output. The system may determine the first size based on the floating-point data.

At step 412, process 400 (e.g., using one or more components described above) compares the size to a threshold size. For example, the system may compare the first size to a first threshold size to determine whether the first size corresponds to the first threshold size. For example, the system may receive a threshold size for a domain. The system may select the threshold size based on one or more criteria. For example, the system may set a threshold size based on how many outliers a given model, application, and/or time period may have.

In some embodiments, the system may receive a threshold size for a domain that is based on a model type of the first model. For example, the model may be a supervised learning model. Supervised learning models learn from labeled training data to predict or classify new, unseen data. They rely on input-output pairs, where the model learns to map inputs to desired outputs. Examples include linear regression, decision trees, support vector machines (SVM), and deep learning models like convolutional neural networks (CNN) and recurrent neural networks (RNN). In another example, the model may be an unsupervised learning model. Unlike supervised learning, unsupervised learning models work with unlabeled data, aiming to discover patterns, structures, or relationships within the data. They learn to identify similarities, identify group data points, or reduce the dimensionality of the data. Clustering algorithms (e.g., k-means, hierarchical clustering) and dimensionality reduction techniques (e.g., principal component analysis, t-SNE) are common examples. In another example, the model may be a generative model. Generative models are capable of generating new data samples similar to the training data they were trained on. These models learn the underlying distribution of the data and can create new instances that possess similar characteristics. Variational Autoencoders (VAEs), Generative Adversarial Networks (GANs), and deep belief networks are examples of generative models. In another example, the model may be a reinforcement learning model. Reinforcement learning involves training models to make sequential decisions in an environment to maximize a reward signal. The model learns through interactions with the environment, receiving feedback in the form of rewards or penalties. Deep Q-Networks (DQNs) and policy gradient methods are popular techniques used in reinforcement learning. In another example, the model may be an NLP model. NLP models are specifically designed to process and understand human language. They enable tasks like language translation, sentiment analysis, text classification, question-answering, and language generation. Examples include RNNs, transformer models (e.g., BERT, GPT), and sequence-to-sequence models. For example, the system may determine a model type of the first model. The system may determine the first threshold size based on the model.

In some embodiments, the system may receive a threshold size for a domain that is based on an application used by the first model. For example, the threshold may be set by requirements for accuracy for the application. In one example, the application may comprise Database Management Systems (DBMS). DBMS applications like Oracle Database, MySQL, or Microsoft SQL Server provide tools for creating, managing, and manipulating databases. They allow users to store, organize, retrieve, and analyze large amounts of structured data efficiently. The system may use one threshold for this type of application and another threshold for a different application. For example, the system may determine an application using outputs from the first model. The system may determine the first threshold size based on the application.

In some embodiments, the system may receive a threshold size for a domain that is based on a time period (e.g., a month, data, quarter, etc.). For example, the system may determine a threshold number of outliers that may be received during a given time period. The system may determine a time period for use of the first model. The system may determine the first threshold size based on the time period.

At step 414, process 400 (e.g., using one or more components described above) deploys a second model based on the comparison. For example, the system may, in response to determining that the first size corresponds to the first threshold size, determine to deploy a second model. The system may perform various operations before, after, and/or during model deployment. For example, the model may be deployed on a local machine, server, and/or cloud server. Additionally or alternatively, the model may be integrated into an application or system that runs on the same machine. The model may then respond to requests or inputs from that application.

In some embodiments, the system may train a new model while using the existing model. For example, the system may retrain a model based on detected outliers. Models can be retrained on feedback data to improve their performance and adapt to new information. Feedback data may comprise data from one or more domains (e.g., domains comprising outlier data) of additional labeled examples or user feedback that provides new information or corrections related to the model's predictions or outputs. This feedback data can be collected through various means, such as user interactions, user ratings, explicit annotations, or manual reviews. The collected feedback data may be combined with the existing training data. This expanded dataset will be used to retrain the model. The feedback data can be mixed with the original training data or added as a separate dataset, depending on the specific retraining approach. The model may then be retrained using the updated training data. The retraining process typically involves iterative steps of feeding the training data through the model, adjusting the model's parameters through techniques like gradient descent, and optimizing the model's performance. The specifics of the retraining process depend on the model type and the algorithms used. For example, the system may retrieve a dataset from the first data domain. The system may retrain the first model using the data.

In some embodiments, the system may train and/or validate a new model before the new model is deployed. For example, after retraining, the model's performance may be evaluated using validation data or evaluation metrics to assess its accuracy, generalization capabilities, and any improvements achieved compared to the previous version. Once the retrained model passes the evaluation stage, it can be deployed to production or used in the intended application. As users interact with the model or provide further feedback, the feedback loop continues, and the model can be further refined through ongoing retraining cycles. For example, the system may retrieve the second model. The system may validate the second model.

In some embodiments, the system may use a data domain comprising the detected outliers to determine when new models should be deployed. For example, the system is equipped with a parameter that thresholds a minimum size of the new data domain (e.g., comprising the detected outliers). Once this threshold is crossed, the system may automatically redeploy a refit model (e.g., trained on the detected outliers) by repointing incoming data requests that fall into the data domain of the currently employed model to the new refit model. As referred to herein, "a data steam" may refer to data that is received from a data source that is indexed or archived by time. This may include streaming data (e.g., as found in streaming media files) or may refer to data that is received from one or more sources over time (e.g., either continuously or in a sporadic nature). A data stream segment may refer to a state or instance of the data stream. For example, a state or instance may refer to a current set of data corresponding to a given time increment or index value. For example, the system may receive time series data as a data stream. A given increment (or instance) of the time series data may correspond to a data stream segment. For example, the system may determine a first data stream that provided a first data input, wherein the first data input is processed by the first model to generate the first data output. The system may redirect data from the first data stream to the second model.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims that follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for supporting always-on applications featuring artificial intelligence models by populating parallel data domains.
2. The method of any one of the preceding embodiments, further comprising: receiving a first data output from a first model; determining, based on statistical analysis, whether the first data output corresponds to a first data domain or a second data domain; in response to determining that the first data output corresponds to the first data domain, generating a second data output by duplicating the first data output; adding the second data output to the first data domain; determining, based on adding the second data output, a first size of the first data domain; comparing the first size to a first threshold size to determine whether the first size corresponds to the first threshold size; and in response to determining that the first size corresponds to the first threshold size, determining to deploy a second model.
3. The method of any one of the preceding embodiments, wherein determining whether the first data output corresponds to the first data domain or the second data domain further comprises: determining a mean for a dataset output by the first model; determining a number of standard deviations of the first data output from the mean; and comparing the number of standard deviations to a threshold number of standard deviation to determine whether the first data output corresponds to the first data domain.
4. The method of any one of the preceding embodiments, wherein determining whether the first data output corresponds to the first data domain or the second data domain further comprises: determining a median for a dataset output by the first model; determining a median absolute deviation of the first data output; and comparing the median absolute deviation to a threshold median absolute deviation to determine whether the first data output corresponds to the first data domain.
5. The method of any one of the preceding embodiments, wherein determining whether the first data output corresponds to the first data domain or the second data domain further comprises: determining a distance of the first data output from a nearest neighboring data in a dataset output by the first model; and comparing the distance to a threshold distance to determine whether the first data output corresponds to the first data domain.
6. The method of any one of the preceding embodiments, wherein determining whether the first data output corresponds to the first data domain or the second data domain further comprises: determining a region for the first data output in a dataset output by the first model; determining a data point density of the region; and comparing the data point density to a threshold data point density to determine whether the first data output corresponds to the first data domain.
7. The method of any one of the preceding embodiments, wherein generating the second data output by duplicating the first data output further comprises: receiving a write operation from a first server to generate the second data output; and logging, by the first server, the write operation.
8. The method of any one of the preceding embodiments, wherein adding the second data output to the first data domain further comprises: determining a first table in the first data domain; and storing the second data output in the first table.
9. The method of any one of the preceding embodiments, wherein adding the second data output to the first data domain further comprises: determining a first pointer location for the first data domain; and storing the second data output based on the first pointer location.
10. The method of any one of the preceding embodiments, wherein determining the first size of the first data domain further comprises: determining floating-point data corresponding to the second data output; and determining the first size based on the floating-point data.
11. The method of any one of the preceding embodiments, wherein comparing the first size to the first threshold size to determine whether the first size corresponds to the first threshold size further comprises: determining a model type of the first model; and determining the first threshold size based on the model.
12. The method of any one of the preceding embodiments, wherein comparing the first size to the first threshold size to determine whether the first size corresponds to the first threshold size further comprises: determining an application using outputs from the first model; and determining the first threshold size based on the application.
13. The method of any one of the preceding embodiments, wherein comparing the first size to the first threshold size to determine whether the first size corresponds to the first threshold size further comprises: determining a time period for use of the first model; and determining the first threshold size based on the time period.

14. The method of any one of the preceding embodiments, wherein determining to deploy the second model further comprises: retrieving a dataset from the first data domain; and retraining the first model using the data.

15. The method of any one of the preceding embodiments, wherein determining to deploy the second model further comprises: retrieving the second model; and validating the second model.

16. The method of any one of the preceding embodiments, wherein determining to deploy the second model further comprises: determining a first data stream that provided a first data input, wherein the first data input is processed by the first model to generate the first data output; and redirecting data from the first data stream to the second model.

17. A non-transitory, computer-readable medium storing instructions that, when executed by a data processing apparatus, cause the data processing apparatus to perform operations comprising those of any of embodiments 1-16.

18. A system comprising one or more processors; and memory storing instructions that, when executed by the processors, cause the processors to effectuate operations comprising those of any of embodiments 1-16.

19. A system comprising means for performing any of embodiments 1-16.

What is claimed is:

1. A system for supporting always-on applications featuring artificial intelligence models by populating parallel data domains, the system comprising:
one or more processors; and
one or more non-transitory, computer-readable media comprising instructions recorded thereon that when executed on the one or more processors causes operations comprising:
receiving, from a first data stream, a first data input;
processing the first data input in a first model to generate a first data output;
determining, based on statistical analysis, whether the first data output corresponds to a first data domain or a second data domain;
in response to determining that the first data output corresponds to the first data domain, generating a second data output by duplicating the first data output;
adding the second data output to the first data domain;
determining, based on adding the second data output, a first size of the first data domain;
comparing the first size to a first threshold size to determine whether the first size corresponds to the first threshold size;
in response to determining that the first size corresponds to the first threshold size, retrieving a second model, wherein the second model is trained on a dataset from the first data domain; and
redirecting data from the first data stream to the second model.

2. A method for supporting always-on applications featuring artificial intelligence models by populating parallel data domains, the method comprising:
receiving a first data output from a first model;
determining, based on statistical analysis, whether the first data output corresponds to a first data domain or a second data domain;
in response to determining that the first data output corresponds to the first data domain, generating a second data output by duplicating the first data output;
adding the second data output to the first data domain;
determining, based on adding the second data output, a first size of the first data domain;
comparing the first size to a first threshold size to determine whether the first size corresponds to the first threshold size; and
in response to determining that the first size corresponds to the first threshold size, determining to deploy a second model by redirecting data from a first data stream to the second model.

3. The method of claim 2, wherein determining whether the first data output corresponds to the first data domain or the second data domain further comprises:
determining a mean for a dataset output by the first model;
determining a number of standard deviations of the first data output from the mean; and
comparing the number of standard deviations to a threshold number of standard deviation to determine whether the first data output corresponds to the first data domain.

4. The method of claim 2, wherein determining whether the first data output corresponds to the first data domain or the second data domain further comprises:
determining a median for a dataset output by the first model;
determining a median absolute deviation of the first data output; and
comparing the median absolute deviation to a threshold median absolute deviation to determine whether the first data output corresponds to the first data domain.

5. The method of claim 2, wherein determining whether the first data output corresponds to the first data domain or the second data domain further comprises:
determining a distance of the first data output from a nearest neighboring data in a dataset output by the first model; and
comparing the distance to a threshold distance to determine whether the first data output corresponds to the first data domain.

6. The method of claim 2, wherein determining whether the first data output corresponds to the first data domain or the second data domain further comprises:
determining a region for the first data output in a dataset output by the first model;
determining a data point density of the region; and
comparing the data point density to a threshold data point density to determine whether the first data output corresponds to the first data domain.

7. The method of claim 2, wherein generating the second data output by duplicating the first data output further comprises:
receiving a write operation from a first server to generate the second data output; and
logging, by the first server, the write operation.

8. The method of claim 2, wherein adding the second data output to the first data domain further comprises:
determining a first table in the first data domain; and
storing the second data output in the first table.

9. The method of claim 2, wherein adding the second data output to the first data domain further comprises:

determining a first pointer location for the first data domain; and storing the second data output based on the first pointer location.

10. The method of claim 2, wherein determining the first size of the first data domain further comprises:

determining floating-point data corresponding to the second data output; and determining the first size based on the floating-point data.

11. The method of claim 2, wherein comparing the first size to the first threshold size to determine whether the first size corresponds to the first threshold size further comprises:

determining a model type of the first model; and determining the first threshold size based on the model type.

12. The method of claim 2, wherein comparing the first size to the first threshold size to determine whether the first size corresponds to the first threshold size further comprises:

determining an application using outputs from the first model; and determining the first threshold size based on the application.

13. The method of claim 2, wherein comparing the first size to the first threshold size to determine whether the first size corresponds to the first threshold size further comprises:

determining a time period for use of the first model; and determining the first threshold size based on the time period.

14. The method of claim 2, wherein determining to deploy the second model further comprises:

retrieving a dataset from the first data domain; and retraining the first model using the dataset.

15. The method of claim 2, wherein determining to deploy the second model further comprises:

retrieving the second model; and validating the second model.

16. The method of claim 2, wherein determining to deploy the second model further comprises:

determining that the first data stream provided a first data input, wherein the first data input is processed by the first model to generate the first data output.

17. The method of claim 2, wherein generating the second data output by duplicating the first data output further comprises:

receiving a read operation from a first server to generate the second data output; and logging, by the first server, the read operation.

18. The method of claim 2, wherein determining whether the first data output corresponds to the first data domain or the second data domain further comprises:

determining a value based on a dataset output by the first model; and determining whether the value corresponds to the first data domain.

19. The method of claim 2, wherein determining whether the first data output corresponds to the first data domain or the second data domain further comprises:

retrieving a first value for the first data domain and a second value for the second data domain; and comparing the first value and the second value to the first data output.

20. The method of claim 2, wherein determining the first size of the first data domain further comprises:

determining data corresponding to the second data output; and determining the first size based on the data.

* * * * *